US011705709B2

(12) United States Patent
Iadanza et al.

(10) Patent No.: US 11,705,709 B2
(45) Date of Patent: Jul. 18, 2023

(54) DRY-TYPE HIGH VOLTAGE CABLE TERMINATION

(71) Applicant: Prysmian S.p.A., Milan (IT)

(72) Inventors: Andrea Iadanza, Milan (IT); Paolo Boffi, Milan (IT)

(73) Assignee: Prysmian S.p.A., Milan (IT)

( * ) Notice: Subject to any disclaimer, the term of this patent is extended or adjusted under 35 U.S.C. 154(b) by 300 days.

(21) Appl. No.: 17/236,866

(22) Filed: Apr. 21, 2021

(65) Prior Publication Data

US 2021/0336432 A1 Oct. 28, 2021

(30) Foreign Application Priority Data

Apr. 28, 2020 (IT) .......................... 102020000009172

(51) Int. Cl.
*H02G 15/068* (2006.01)
*H02G 15/064* (2006.01)
*H01R 13/53* (2006.01)

(52) U.S. Cl.
CPC ........... *H02G 15/068* (2013.01); *H01R 13/53* (2013.01)

(58) Field of Classification Search
CPC .... H02G 15/068; H02G 15/064; H02G 15/06; H02G 15/02
See application file for complete search history.

(56) References Cited

U.S. PATENT DOCUMENTS

| 6,074,229 A * | 6/2000 | Johansson | H02G 15/06 439/886 |
| 6,265,663 B1 * | 7/2001 | Cicogna | H02G 15/068 174/75 D |
| 9,048,652 B2 | 6/2015 | Hoglund et al. | |
| 10,236,672 B2 | 3/2019 | Tan et al. | |
| 2003/0003802 A1 * | 1/2003 | Amerpohl | H02G 15/068 439/587 |
| 2012/0138360 A1 * | 6/2012 | Gaubert | H02G 15/068 174/74 A |
| 2013/0078836 A1 * | 3/2013 | Li | H02G 15/068 439/198 |
| 2014/0076624 A1 * | 3/2014 | Bohlin | H02G 7/05 174/40 R |
| 2014/0076627 A1 * | 3/2014 | Maher | H02G 15/064 174/77 R |

(Continued)

FOREIGN PATENT DOCUMENTS

| EP | 0667665 A1 | 8/1995 |
| WO | 2011144253 A2 | 11/2011 |

*Primary Examiner* — Hoag Nguyen
*Assistant Examiner* — Amol H Patel
(74) *Attorney, Agent, or Firm* — Slater Matsil, LLP

(57) ABSTRACT

The present disclosure relates to a dry-type cable termination comprising: a tubular support structure comprising: an insulator support comprising a frustoconical portion, wherein the insulator support is made of an electrically insulating non-metallic composite material having a tensile modulus of at least 11 GPa; and a screen tube; an insulating body at least partially externally covering and directly contacting the support structure; an elastomeric stress cone housed in the frustoconical portion and in direct contact to the frustoconical portion; an electrode, housed within the screen tube, connected with the stress cone and in electric contact with the screen tube.

22 Claims, 3 Drawing Sheets

(56) References Cited

U.S. PATENT DOCUMENTS

| | | | |
|---|---|---|---|
| 2016/0134094 A1* | 5/2016 | Wentzel | H02G 15/068 |
| | | | 29/857 |
| 2016/0358698 A1* | 12/2016 | Murata | H02G 15/02 |
| 2017/0201040 A1* | 7/2017 | Tan | H01R 13/53 |
| 2017/0207617 A1 | 7/2017 | Tan et al. | |
| 2018/0062370 A1* | 3/2018 | Heidmann | H02G 15/068 |
| 2018/0219369 A1* | 8/2018 | Czyzewski | H02G 15/064 |
| 2018/0233894 A1* | 8/2018 | Tan | H02G 15/068 |

* cited by examiner

DRY-TYPE HIGH VOLTAGE CABLE TERMINATION

CROSS-REFERENCE TO RELATED APPLICATIONS

This application claims the benefit of Italian Patent Application No. 102020000009172 filed on Apr. 28, 2020, which application is hereby incorporated herein by reference.

TECHNICAL FIELD

The present disclosure relates to a high voltage (HV) cable termination of the dry-type, i.e. a power cable termination free from electrically insulating fluids, such as oil or gas other than atmospheric air.

BACKGROUND

Several types of HV cable terminations are known in the art.

According to a first type, cable terminations comprise a porcelain or composite insulator filled with a fluid insulating material, such as silicone or other synthetic oils, or sulfur hexafluoride ($SF_6$) gas, and a geometric stress control element. These terminations, however, are subjected to a risk of leakage and of moisture absorption, and additionally, require a long and complex installation procedure.

According to another type, the termination comprises a silicon pre-molded body and no fluid filling is provided. This dry-type cable termination, however, is not self-standing and requires a support for the silicone body which increases in size and mounting complexity hand in hand with the termination size.

According to another type of dry-type cable termination, the insulator is made of an epoxy resin. However, the epoxy resin component is fragile and, consequently, has a low seismic resistance and a low impact resistance. Additionally, it has a high weight, which renders difficult to apply this kind of design to higher voltage classes, and may break during handling and transportation.

According to another type of dry-type cable termination, the insulator is filled with an electrically insulating gel. If the filling is made in the field, a suitable apparatus is needed, while if the filling is made in the factory, the termination is then heavy and difficult to transport.

U.S. Pat. No. 10,236,672 discloses an example of a dry-type power cable termination comprising: an insulation sleeve, a stress control cone received within the insulation sleeve, a shielding sleeve received within the insulation sleeve and fitted over an exposed segment of an insulation layer of the power cable, an electrode received within the insulation sleeve and electrically connected to a first end of the shielding sleeve, an electric connection assembly received within the insulation sleeve and used to electrically connect a second end of the shielding sleeve opposite to the first end to an exposed segment of a conductor core of the power cable.

Another example is given by U.S. Pat. No. 9,048,652, disclosing a cable termination device of the dry type, including an insulator housing having a hollow interior, which lower end has an opening for insertion of the cable. The device further includes a stress controller device located inside the insulator housing, and an electrically insulating gel filling at least part of the hollow interior of the insulator housing and surrounding at least part of the stress controller device.

Another example is given by EP 0 667 665 A1, which discloses a terminal for a high-voltage electric cable, wherein the cable is interrupted at the inside of the terminal and the cable portion until connection to the overhead conductor is replaced with a rigid conductive element, preferably in form of a tubular element made of copper, provided with a ribbed rubber coating resting on a bearing structure through an insulating base preferably made of an epoxy resin.

SUMMARY

In one embodiment, a dry-type cable termination includes a tubular support structure comprising an insulator support comprising a frustoconical portion and a screen tube. The insulator support is made of an electrically insulating non-metallic composite material having a tensile modulus of at least 11 GPa. The dry-type cable termination further includes an insulating body at least partially externally covering and directly contacting the tubular support structure, an elastomeric stress cone housed in the frustoconical portion and in direct contact to the frustoconical portion, and an electrode, housed within the screen tube, connected with the stress cone and in electric contact with the screen tube.

BRIEF DESCRIPTION OF THE DRAWINGS

Further characteristics and advantages will be more apparent from the following description of some embodiments given as a way of an example with reference to the enclosed drawings in which.

DETAILED DESCRIPTION OF ILLUSTRATIVE EMBODIMENTS

Figures 1, 2:
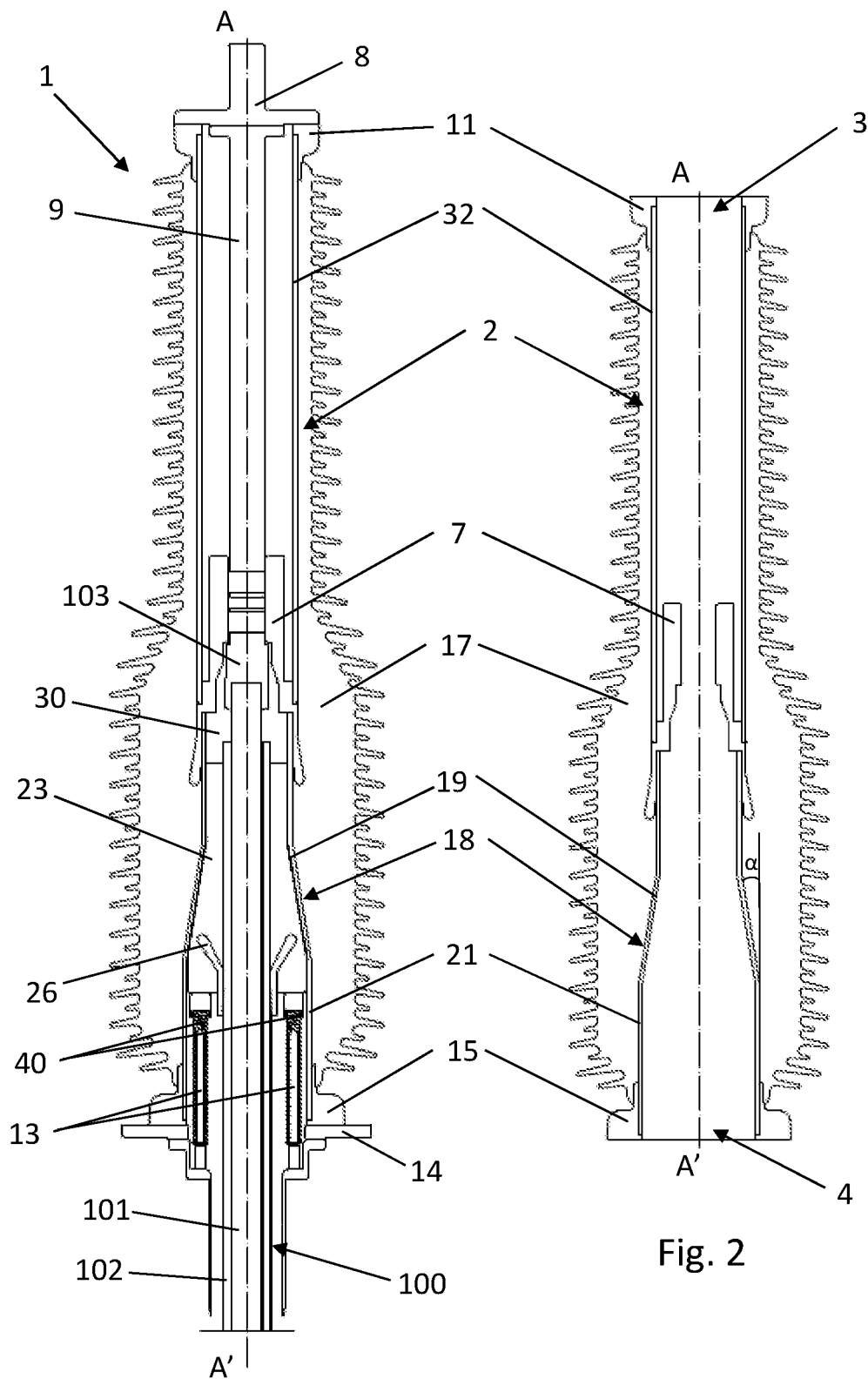
FIG. 1 is a sectional view, taken along a longitudinal plane, of a dry-type high voltage cable termination according to an embodiment of the present disclosure.
FIG. 2 is a sectional view, taken along a longitudinal plane, of a tubular support structure and insulating body of FIG. 1 with other portions annexed.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The present disclosure, in at least one of the aforementioned aspects, can be implemented according to one or more of the following embodiments, optionally combined together.

For the purpose of the present description and of the appended claims, the words "a" or "an" should be read to include one or at least one and the singular also includes the plural unless it is obvious that it is meant otherwise. This is done merely for convenience and to give a general sense of the disclosure.

In the present description and claims, terms like "upper" and "lower" are used to indicate positions within the cable termination intended standing vertical, as in operating condition.

As discussed above, the known HV cable terminations, specifically the dry-type HV cable terminations, have reliability problems and/or poor mechanical resistance and/or need auxiliary insulators and/or are heavy and/or difficult to be installed.

The Applicant therefore aims at providing a HV cable termination of the dry-type with improved features, which is safe environmentally and for the personnel working on the same, particularly in case of explosion or seismic events, and which allows an easy on-site assembly.

This aim is achieved by a dry-type power cable termination where the supporting function is assigned to the electrical insulator (or insulating body) made, to this end, of a suitable material, provided around and in direct contact to an elastomeric stress cone and mechanically connected to a metal electrode.

Accordingly, the present disclosure relates to a dry-type power cable termination comprising: a tubular support structure comprising: an insulator support comprising a frustoconical portion, wherein the insulator support is made of an electrically insulating non-metallic composite material having a tensile modulus of at least 11 GPa; a screen tube; an insulating body at least partially externally covering and directly contacting the support structure; an elastomeric stress cone housed in the frustoconical portion in direct contact thereto; an electrode housed within the screen tube, connected with the stress cone and in electric contact with the support structure screen tube.

In an embodiment, the insulator support is made of a non-metallic composite material having a tensile modulus up to 30 GPa.

In an embodiment, the insulator support is made of a non-metallic composite material having a flexural modulus of at least 11 GPa, for example up to 30 GPa.

In an embodiment, the insulating body is made of single material and one layer.

In an embodiment, the elastomeric stress cone is made of an elastomeric thermosetting material selected from, for example, silicone rubber, ethylene propylene rubber (EPR) and ethylene propylene diene rubber (EPDM).

The dry-type HV cable termination according to the present disclosure does not need any electrically insulating fluid, such as an electrically insulating oil, gas, or gel (but it can contain air), and is therefore safer in case of explosion or seismic events. In the latter case, the cable termination shows elastic properties suitable for absorbing the seismic forces.

The cable termination according to the present disclosure is lighter compared, for example, to a known cable termination with similar performances having a support structure made of an epoxy resin.

FIG. 1 shows an embodiment of a dry-type high voltage HV cable termination 1 and an end portion of a HV cable wo housed therein. The cable wo as shown in FIG. 1 comprises an electric conductor 101 and a cable insulation 102, wherein the end portion of the electric conductor 101 is bared from the insulation 102 and is inserted in a lug 103 putting the electric conductor 101 in electric contact with a termination electrode 7.

The termination 1 comprises a tubular support structure 2 (see also FIG. 2) having an upper end 3 and a lower end 4, being open. The support structure 2 comprises a tubular insulator support 18 (comprising the lower end 4) and a screen tube 32 (comprising the upper end 3). The screen tube 32 houses the electrode 7 and the insertion of the cable conductor 101 in the electrode 7.

The electrode 7 is made, for example, of an electrically conductive metal like aluminum, copper and alloys or composites thereof. The electrode 7 is mechanically and electrically connected with the cable conductor lug 103.

The termination 1 further comprises a shank 8 mechanically and electrically connected to the upper end 3 of the support structure 2. The shank 8 is also electrically connected to the electrode 7, for example through an electrically conductive bar 9 made, for example, of aluminum. The shank 8 is connected to the support structure 2 upper end 3 by a first annular element 11 made of an electrically conductive material having, for example, a conductivity of at least $4 \times 10^6$ Ω·m. The annular element 11 can be made of a metal like that exemplified for the electrode 7.

The termination 1 further comprises an electrically insulating body 17, which can be ribbed, externally covering and directly contacting the support structure 2. The insulating body 17 should fulfil the requirement of IEC 60587 (2007). It is made of a single, solid portion made of a single material, for example of silicone rubber or of ethylene polymer rubber (EPR). In an embodiment, the material of the insulating body can have one or more of the following features: relative Dielectric Permittivity of from 2.3 to 4.5; dielectric strength of at least 20 kV/mm; power factor (tan δ) up to $10^{-2}$; Density of from 0.9 to-1.3 g/cm$^3$.

In an embodiment, the electrically insulating body 17 has a thickness ranging from 20 mm to 300 mm, extremes included, such thickness possibly varying within this range along the insulating body length.

The support structure 2 comprises a tubular insulator support 18 comprising a frustoconical portion 19 oriented such that the sectional dimension in an axial direction of the same decreases toward the support upper end 3. According to an embodiment, the insulator support 18 further can comprise a cylindrical portion 21 at the support lower end 4. The cylindrical portion 21, when present, is in lower position with respect to the frustoconical portion 19. The frustoconical portion 19 forms an angle α with respect to the insulator support 18 longitudinal axis (A-A'), which can be comprised between 1° and 15°, for example from 2° to 10°.

The insulator support 18 is made of a non-metallic composite material having the already mentioned mechanical feature. As "non-metallic composite material" it is meant a material having non-metallic organic and inorganic component, for example fiberglass. A suitable composite material for the insulator of the present disclosure further has at least one of the following features: relative dielectric permittivity of at least 4; dielectric strength of at least 5 kV/mm; power factor (tan δ) up to 10-2; tensile strength of at least 80 MPa; flexural strength of at least 80 MPa; density of at least 1.3 g/cm3, for example up to 2.1 g/cm3.

In an embodiment, the insulator support 18 is made of a non-metallic composite material having flame retardant or fire resistant property, for example a zero-halogen material.

According to an embodiment, the insulator support 18 is made of fiber glass, for example of glass fiber reinforced resin. The tubular insulator support 18 can be manufactured, for example, by a filament winding process.

The termination 1 comprises a stress cone 23 made of an elastomeric material. The stress cone 23 is housed in the tubular insulator support 18, in direct contact thereto.

The stress cone 23 comprises a through channel for the passage of the cable 100.

In an embodiment, the stress cone 23 is made of an insulating elastomeric thermosetting material having, for example, a relative dielectric permittivity of from 2.3 to 4.5. In an embodiment, the insulating elastomeric thermosetting material of the stress cone has a dielectric strength of at least 20 kV/mm. In an embodiment, the insulating elastomeric thermosetting material of the stress cone has a power factor (tan δ) up to $10^{-2}$.

In an embodiment, the stress cone 23 at least partially embeds a semiconductive deflector 26, for example at the lowest portion thereof. The deflector 26 is made of a semiconductive material, for example, an elastomeric thermosetting material like that of the stress cone 23 itself, but made semiconductive by the addition of a suitable conductive filler, e.g. carbon black. The semiconductive material of the deflector 26 has an electrical resistivity of at least 0.1 Ω*m, for example up to 15 Ω*m.

The support structure 2 comprises a screen tube 32 in electrical continuity with the electrode 7 (and, accordingly, with the shank 8). The screen tube 32 extends between frustoconical portion 19 of the tubular insulator support 18 and the upper end 3 of the support structure 2. In an embodiment, the screen tube 32 is cylindrical. The screen tube 32 can be made of an electrically conductive material, such as aluminum, copper, steel, and alloys or composites thereof. Alternatively, the screen tube 32 can be made of an electrically insulating material similar to that of the insulator support 18 externally covered with a semiconductive layer, for example in form of a paint.

The electrode 7 is positioned within the screen tube 32, between the stress cone 23 and the upper end 3 of the support structure 2. The electrode 7 may be in contact with the stress cone 23, directly or, for example, through an electrically conductive blocking ring 30 made, for example of copper, aluminum or steel.

The electrode 7 can be made of an electrically conductive material like that already mentioned above in connection with the material of the first annular element 11.

In an embodiment, the electrically conductive bar 9 extends from the electrode 7 to the shank 8 within the screen tube 32.

According to an embodiment, the termination 1 comprises, at the lower end 4 of the support structure 2, a thrust device 13 for urging the stress cone 23 in the insulator support 18. In an embodiment, the thrust device 13 can comprise an elastic device, such as springs 40.

The thrust device 13 and the support structure 2 can be fixed, for example by a second annular element 15, on a plate 14 for the mechanical connection to the scaffold (only partially sketched). The second annular element 15 can be made of an electrically conductive material like that already mentioned above in connection with the material of the first annular element 11 and of the electrode 7. The second annular element 15 can be connected to the cylindrical portion 21.

The first and second annular elements 11 and 15, though connected to the support structure 2, are herein not considered part thereof. Accordingly, the first and second annular element 11 and 15 can be not or only partially covered by the insulating body 17.

FIG. 2 shows a detail of the cable termination 1 of FIG. 1. The screen tube 32 can be made of an electrically conductive material.

In an embodiment, the insulating body 17 is provided by, for example, injection molding or extrusion, to surround the whole support structure 2 including the insulator support 18 and the screen tube 32 connected as described, such that the insulating body 17, the insulator support 18 and the screen tube 32 can be provided in one single piece to be assembled to the rest of the termination 1.

Figures 3, 4:
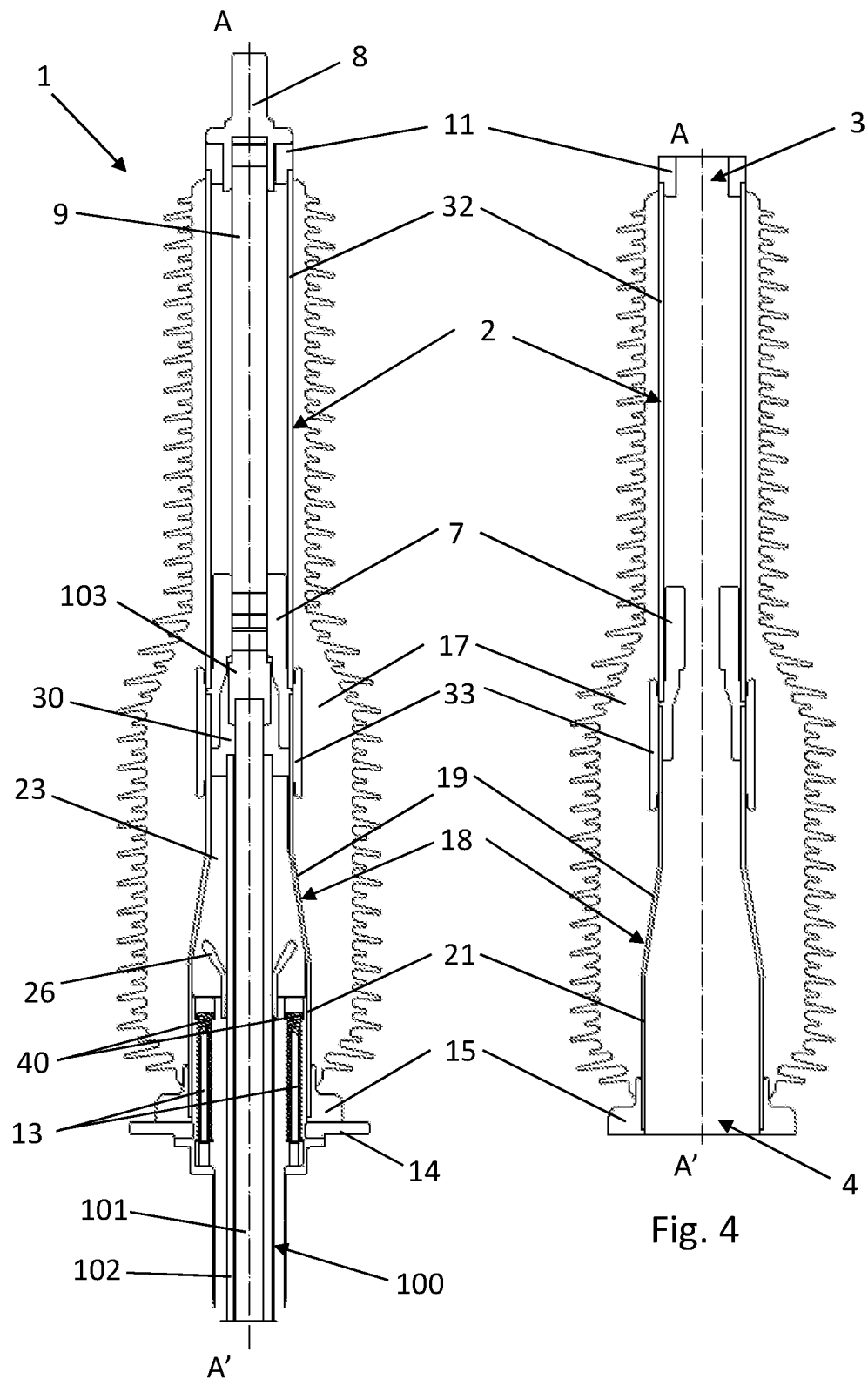
FIG. 3 is a sectional view, taken along a longitudinal plane, of a dry-type high voltage cable termination according to another embodiment of the present disclosure.
FIG. 4 is a sectional view, taken along a longitudinal plane, of a tubular support structure and insulating body of FIG. 3 with other portions annexed.

FIGS. 3 and 4 show an alternative embodiment of the termination 1, the reference number indicating the same portion of FIGS. 1 and 2. In this termination 1, the electrical contact between the electrode 7 and the screen tube 32 can take place at a connection belt 33 which can at least partially envelop and optionally directly contact the electrode 7. The connection belt 33 can be made of an electrically conductive metal, for example, aluminum, or can be made of, a semiconductive material, such as silicone rubber or EPR added with a semiconductive filler, such as carbon black. The connection belt 33 can be in form of a ring externally positioned at the interface between the screen tube 32 and the insulator support 18, and is in direct contact with them. The connection belt 33 can be provided where the electrical contact between the electrode 7 and the screen tube 32 of the support structure 2 takes place.

Figures 5, 6:
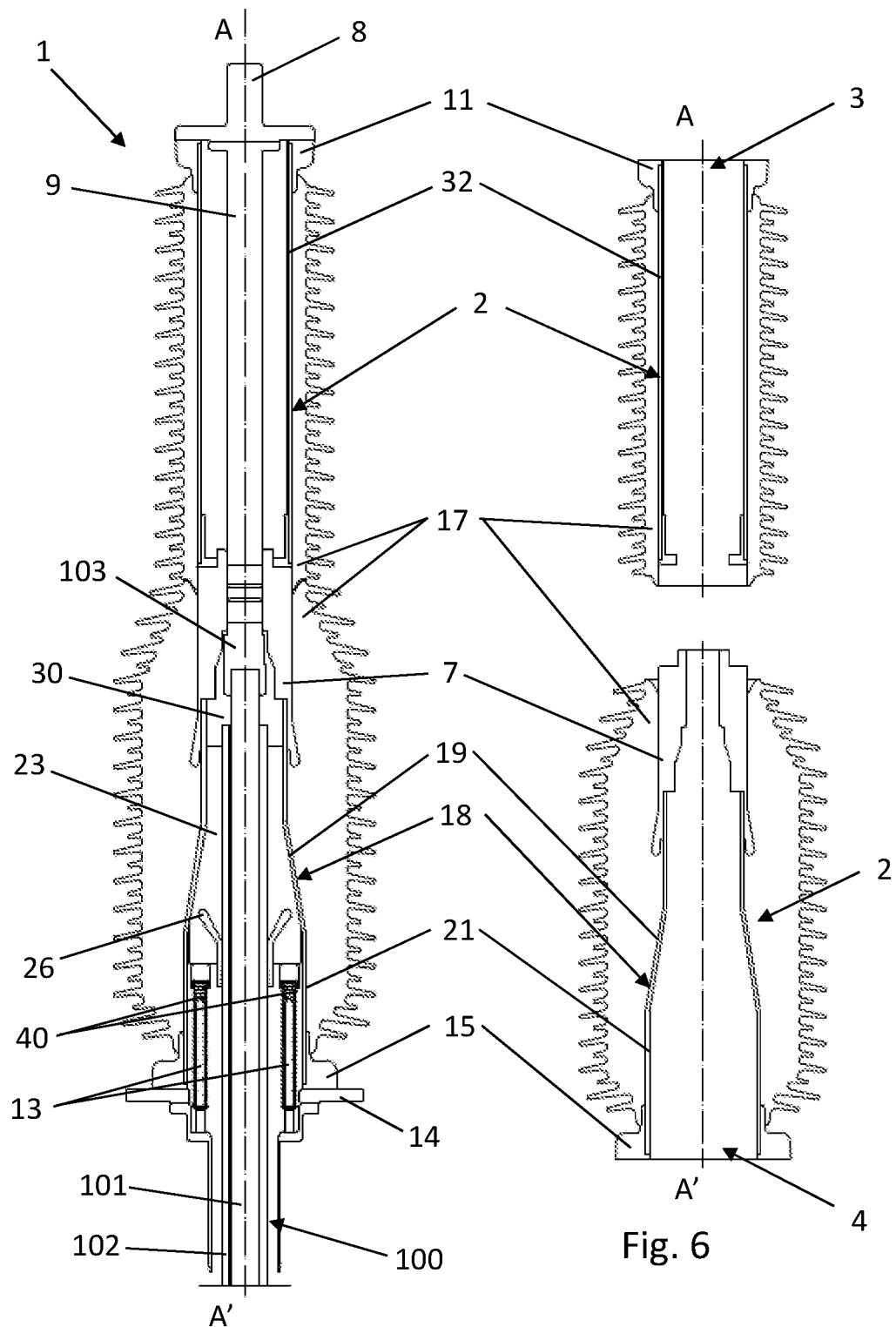
FIG. 5 is a sectional view, taken along a longitudinal plane, of a dry-type high voltage cable termination according to a further embodiment of the present disclosure.
FIG. 6 is a sectional view, taken along a longitudinal plane, of a tubular support structure and insulating body of FIG. 5 with other portions annexed.

In an embodiment, the insulator support 18 and the screen tube 32 of the cable termination 1 according to the present disclosure can be formed enclosed by an insulating body 17 made of one single piece, as shown in FIGS. 1-4. Alternatively, as shown in FIGS. 5-6 discussed in the following, the insulator support 18 (containing the electrode 7) and the screen tube 32 are each enclosed in a relevant portion of insulating body 17 (two-pieced configuration) which can be transported separately and joined ad the stage of the in situ mounting of the cable termination 1. Each portion of the insulating body 17 is made of single material and one layer. The two-pieced configuration can be used in case of particularly long or heavy cable termination.

According to a further embodiment shown in FIGS. 5 and 6 (the reference numbers indicate the same portion of FIGS. 1 and 2), the screen tube 32 is realized in substantially the same material as the insulator support 18, for example fiberglass resin. In FIG. 6 insulator support 18 and the screen tube 32 of the tubular support structure 2 are shown disjointed as, for example, during transport. In order to ensure the electrical continuity with the electrode 7, the screen tube 32 can comprise a conductive or semi-conductive coating on its internal wall and be in electrical contact with the electrode 7.

In all the embodiments, all of the portions of the power cable termination are void of electrically insulating filling fluids, such as electrically insulating oil or gas other than atmospheric air, or gels. Therefore, the cable termination according to the present disclosure is fully dry.

What is claimed is:
1. A dry-type cable termination comprising:
   a tubular support structure comprising:
      an insulator support comprising a frustoconical portion, the insulator support being made of an electrically insulating non-metallic composite material having a tensile modulus of at least 11 GPa, and
      a screen tube;
   an insulating body at least partially externally covering and directly contacting the tubular support structure;

an elastomeric stress cone housed in the frustoconical portion and in direct contact to the frustoconical portion; and an electrode, housed within the screen tube, connected with the stress cone and in electric contact with the screen tube.

2. The dry-type cable termination according to claim 1, wherein the insulator support is made of a non-metallic composite material having a tensile modulus up to 30 GPa.

3. The dry-type cable termination according to claim 1, wherein the insulator support is made of a non-metallic composite material having a flexural modulus of at least 11 GPa.

4. The dry-type cable termination according to claim 1, wherein the support structure insulator support is made of fiber-glass.

5. The dry-type cable termination according to claim 1, wherein the insulator support comprises a cylindrical portion in lower position with respect to the frustoconical portion.

6. The dry-type cable termination according to claim 1, wherein the insulator support has a longitudinal axis and the frustoconical portion forms an angle with the longitudinal axis comprised between 1° and 15°.

7. The dry-type cable termination according to claim 6, wherein the frustoconical portion forms an angle with the longitudinal axis comprised between 2° and 10°.

8. The dry-type cable termination according to claim 1, wherein the screen portion is made of an electrically conductive material.

9. The dry-type cable termination according to claim 8, wherein the screen portion is made of aluminum, copper, steel, and alloys or composites thereof.

10. The dry-type cable termination according to claim 1, wherein the screen portion is made of an electrically insulating non-metallic composite material having a tensile modulus of at least 11 GPa and externally covered with a semiconductive layer.

11. The dry-type cable termination according to claim 1, wherein the insulating body is made of single material and one layer.

12. The dry-type cable termination according to claim 1, wherein the insulating body is made of two portions enclosing, respectively, the insulator support and the screen tube.

13. The dry-type cable termination according to claim 1, wherein the insulating body is made of a material fulfilling the requirement of IEC 60587 (2007).

14. The dry-type cable termination according to claim 1, wherein the insulating body has a thickness ranging from 20 mm to 300 mm, extremes included.

15. The dry-type cable termination according to claim 1, wherein the elastomeric stress cone is made of an elastomeric thermosetting material.

16. The dry-type cable termination according to claim 15, wherein the elastomeric thermosetting material is selected from silicone rubber, ethylene propylene rubber (EPR) and ethylene propylene diene rubber (EPDM).

17. The dry-type cable termination according to claim 15, wherein the stress cone is made of an insulating elastomeric thermosetting material having a relative dielectric permittivity of from 2.3 to 4.5.

18. The dry-type cable termination according to claim 1, wherein the stress cone at least partially embeds a semiconductive deflector.

19. The dry-type cable termination according to claim 1, wherein the electrode directly contacts the stress cone.

20. The dry-type cable termination according to claim 1, wherein the electrode contacts the stress cone via an electrically conductive blocking ring.

21. The dry-type cable termination according to claim 1, wherein the electrode contacts the screen tube via a connection belt.

22. The dry-type cable termination according to claim 21, wherein the connection belt is made of an electrically conductive material or of a semiconductive material.

* * * * *